A. T. BURCH.
MORTISE NAIL.
APPLICATION FILED JULY 8, 1908.
920,535.
Patented May 4, 1909.
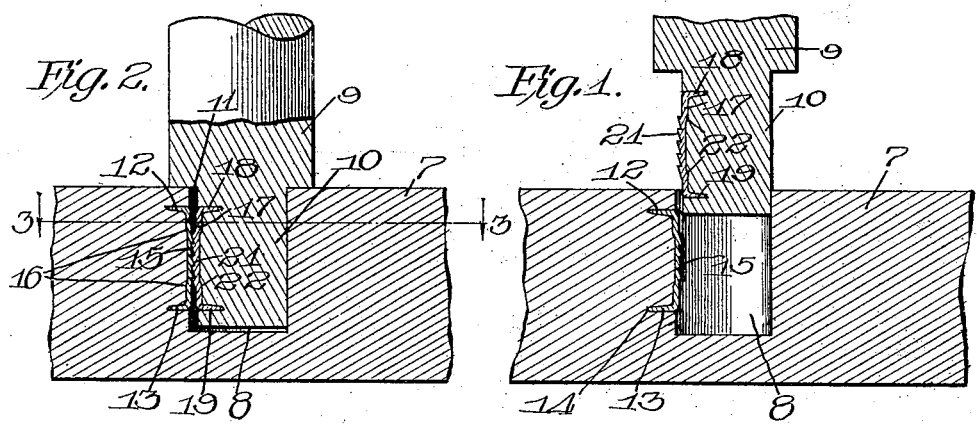
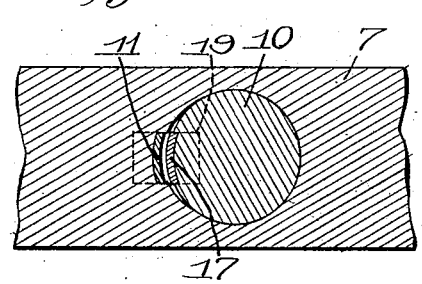
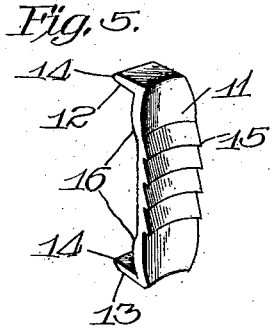
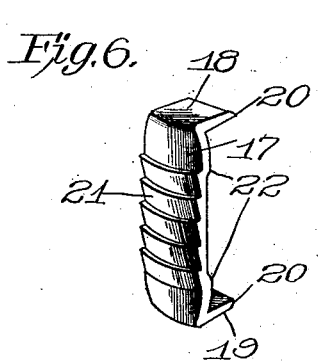
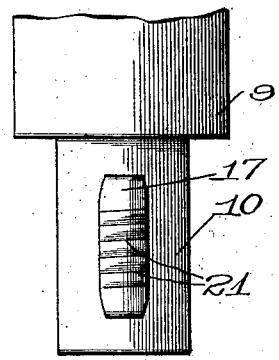
Witnesses:
Inventor:
Alfred T. Burch

UNITED STATES PATENT OFFICE.

ALFRED T. BURCH, OF RIVERSIDE, ILLINOIS.

MORTISE-NAIL.

No. 920,535.  Specification of Letters Patent.  Patented May 4, 1909.

Application filed July 8, 1908. Serial No. 442,542.

*To all whom it may concern:*

Be it known that I, ALFRED T. BURCH, a citizen of the United States, residing at Riverside, in the county of Cook and State of Illinois, have invented certain new and useful Improvements in Mortise-Nails, of which the following is a specification, reference being had to the accompanying drawings.

My invention relates to fasteners for wood joints and has for its object to provide a new and improved fastener which may be readily applied and which will act automatically to firmly secure the joined parts together. I accomplish this object as illustrated in the drawings and as hereinafter described.

What I regard as new is set forth in the claims.

In the drawings, Figure 1 is a sectional view showing tongued and mortised members having my improved fastener applied thereto, before the tongue is inserted in the mortise; Fig. 2 is a similar view, showing the tongue seated in the mortise; Fig. 3 is a section on line 3—3 of Fig. 2; Fig. 4 is an elevation of the tongued member showing one member of the fastener applied thereto; Fig. 5 is a perspective view of the mortise member of the fastener; and Fig. 6 is a similar view of the tongue member of the fastener or nail.

Referring to the drawings,—7 indicates a board, such as a chair seat, having a mortise 8 therein.

9 indicates a member, such as the leg of a chair, having a tongue 10 adapted to fit in the mortise 8.

11 indicates the mortise member of the nail or fastener, which, as shown in Figs. 3 and 5, is in the form of a concavo-convex plate having end portions 12—13 bent at right angles, or substantially so, and provided with comparatively sharp edges 14 adapted to cut into the wood. The end portions 12—13 of the mortise member 11 project at the convex side of the plate so that when the fastener is fitted in place in the manner shown in Figs. 1 and 2 the concave side conforms more or less to the inner surface of the mortise. The concave side of the mortise member 11 is provided with a series of downwardly-projecting teeth 15 in the form of ratchet teeth to engage oppositely-disposed teeth carried by the tenon or tongue member of the fastener, as will be hereinafter described. The member 11 is also provided with thickened portions or shoulders 16 near its ends on the convex side, as shown in Fig. 5, thereby strengthening it at those points.

17 indicates the tenon or tongue member of the fastener, which, in general, is similar to the mortise member, being composed of a plate having end portions 18—19 bent substantially at right angles and provided with cutting edges 20. The tenon member 17 is also concavo-convex, but the ends 18—19 project at the concave side thereof instead of at the convex side as in the case of the mortise member; also the tenon member 17 is provided with upwardly-projecting teeth 21 on its convex side, which are adapted to engage the teeth 15 of the mortise member. The tenon member is provided also with shoulders 22 at its ends similar to the shoulders 16.

The mortise and tenon members 11 and 17 are applied to the mortise and tenon, respectively, in the manner shown in Figs. 1 and 2, their bent end portions being forced into the wood so that the intermediate portions thereof lie closely in contact with the members to which they are secured,—this being facilitated by the curvature of the members of the fastener, as above described. In applying the tongue to the mortise it is turned so as to bring its fastener member into alinement with the fastener member in the mortise, and is then forced down into the mortise, the teeth 21 passing over the teeth 15 as the tongue moves inward. When the tongue and mortise are properly proportioned this forces the intermediate portions of the fastener members into the wood to some extent, taking up the shrinkage of the wood and causing the elasticity of the wood to force the fastener members out again when the teeth properly lock, thereby holding them firmly in interlocking engagement. Owing to the shape of the fastener members the forcing of the tongue into the mortise does not bruise the wood.

When the parts are interlocked it will be seen that they cannot be separated by a direct pull, but if desired they may be disengaged by rotating the tongue sufficiently to carry the teeth of its fastener member out of engagement with those of the other fastener member. In any structure, such as a chair, for example, where the legs are held against rotation by the rounds, the parts cannot separate, but even in the absence of any devices for preventing rotation of the parts there is no danger of accidental disengagement because the spring of the wood will be sufficient to normally hold the members of the fastener firmly in engagement with each other. By providing the shoulders at the end portions of the fastener members the metal is strengthened at the bends and also the teeth are caused to protrude somewhat beyond the face of the plate and thereby secure a better engagement with each other when assembled.

So far as I am aware, no one has heretofore provided a two-part fastener comprising members adapted to be secured respectively to the mortise and tenon and to interlock when the tenon is fitted into the mortise. My invention, therefore, is generic in character and the claims hereinafter made are to be construed accordingly.

While my improved fastener is intended primarily for use in connection with wood joints, it may also be used for any other situation to which it is adapted.

That which I claim as my invention, and desire to secure by Letters Patent, is,—

1. A fastener, comprising mortise and tenon members having their ends bent at right angles to the face of the member and adapted to engage the parts to which they are secured, said mortise member having intermediately-disposed downwardly-projecting teeth and said tenon member having intermediately-disposed upwardly-projecting teeth adapted to interlock with the teeth on the mortise member.

2. A fastener, comprising mortise and tenon members having their ends bent at right angles to the face of the member and adapted to engage the parts to which they are secured, said mortise member having intermediately-disposed downwardly-projecting teeth and said tenon member having intermediately-disposed upwardly-projecting teeth adapted to interlock with the teeth on the mortise member, said mortise and tenon members being concavo-convex in cross-section.

3. A fastener, comprising mortise and tenon members having their ends bent at right angles to the face of the member and adapted to engage the parts to which they are secured, said mortise member having intermediately-disposed downwardly-projecting teeth and said tenon member having intermediately-disposed upwardly-projecting teeth adapted to interlock with the teeth on the mortise member, said members having shoulders near their bent end portions.

ALFRED T. BURCH.

Witnesses:
   CHARLES E. PICKARD,
   RAWSON J. PICKARD.